United States Patent
Matheson et al.

(10) Patent No.: US 12,185,039 B1
(45) Date of Patent: *Dec. 31, 2024

(54) VEHICLE TRACKING TECHNIQUES

(71) Applicant: United Services Automobile Association (USAA), San Antonio, TX (US)

(72) Inventors: Cory A. Matheson, Celina, TX (US); Kade L. Scott, The Colony, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 119 days.

This patent is subject to a terminal disclaimer.

(21) Appl. No.: 17/517,968

(22) Filed: Nov. 3, 2021

Related U.S. Application Data

(63) Continuation of application No. 16/827,435, filed on Mar. 23, 2020, now Pat. No. 11,197,076, which is a
(Continued)

(51) Int. Cl.
*G08C 19/22* (2006.01)
*G07C 5/00* (2006.01)
(Continued)

(52) U.S. Cl.
CPC ............... *H04Q 9/00* (2013.01); *G07C 5/008* (2013.01); *G07C 5/085* (2013.01); *H04L 67/12* (2013.01); *H04L 67/30* (2013.01)

(58) Field of Classification Search
CPC .......... H04Q 9/00; G07C 5/008; G07C 5/085; H04L 67/12; H04L 67/30
See application file for complete search history.

(56) References Cited

U.S. PATENT DOCUMENTS 6,188,939 B1 * 2/2001 Morgan ............... B60Q 1/2611
340/815.69
6,433,706 B1 * 8/2002 Anderson, III ........ G08G 1/017
340/933
(Continued)

FOREIGN PATENT DOCUMENTS

WO    WO-2018109645 A1 *    6/2018    ............. G06Q 10/10

OTHER PUBLICATIONS

Chin et al., Solutions of Wireless Sensor Networks for Driver Associate (Year: 2008).
(Continued)

*Primary Examiner* — Quang Pham
(74) *Attorney, Agent, or Firm* — Fletcher Yoder, P.C.

(57) ABSTRACT

A vehicle monitoring system, includes a vehicle database, which includes information associated with a plurality of vehicles. The vehicle monitoring system also includes a sensor database, which includes information captured by a sensor of an observing vehicle, and one or more processors. The one or more processors may generate a request to determine information associated with a target vehicle and to transmit the request to the sensor in response to determining that the information captured by the sensor does not include the information associated with the target vehicle. The sensor captures the information associated with the target vehicle based at least in part on the request. The one or more processors may also receive and store the information associated with the target vehicle from the sensor. Further, the one or more processors may output the information associated with the target vehicle to a computing device.

18 Claims, 2 Drawing Sheets

Related U.S. Application Data continuation of application No. 16/247,224, filed on Jan. 14, 2019, now Pat. No. 10,623,834.

(60) Provisional application No. 62/617,432, filed on Jan. 15, 2018.

(51) Int. Cl.
*G07C 5/08* (2006.01)
*H04L 67/12* (2022.01)
*H04L 67/30* (2022.01)
*H04Q 9/00* (2006.01)

(56) References Cited

U.S. PATENT DOCUMENTS

| | | | |
|---|---|---|---|
| 6,437,690 B1* | 8/2002 | Okezie | B60R 25/33 340/505 |
| 6,611,755 B1* | 8/2003 | Coffee | B28C 9/00 455/526 |
| 6,982,654 B2* | 1/2006 | Rau | G08G 1/0175 348/148 |
| 7,242,287 B1* | 7/2007 | Giovinazzo | B60Q 1/44 340/436 |
| 8,885,039 B2* | 11/2014 | Jang | G01C 21/36 340/904 |
| 9,283,827 B2* | 3/2016 | Nishida | B60H 1/00771 |
| 9,395,186 B2* | 7/2016 | Link, II | G06F 16/9537 |
| 9,527,384 B2* | 12/2016 | Bando | G08G 1/0104 |
| 9,576,480 B1* | 2/2017 | Shoshan | G08G 1/096716 |
| 9,805,601 B1* | 10/2017 | Fields | G06V 20/58 |
| 9,970,615 B1* | 5/2018 | Cardillo | G08G 1/20 |
| 10,319,039 B1* | 6/2019 | Konrardy | G06Q 40/08 |
| 10,424,176 B2* | 9/2019 | Shahid | G08G 1/09623 |
| 10,460,534 B1* | 10/2019 | Brandmaier | G07C 5/008 |
| 10,504,302 B1* | 12/2019 | Chavez | H04W 4/90 |
| 10,783,586 B1* | 9/2020 | Augustine | G06Q 40/08 |
| 10,796,369 B1* | 10/2020 | Augustine | G06Q 40/08 |
| 2001/0020204 A1 | 9/2001 | Runyon et al. | |
| 2002/0080013 A1* | 6/2002 | Anderson, III | G07C 5/0891 340/936 |
| 2003/0200227 A1* | 10/2003 | Ressler | G08G 1/017 |
| 2004/0046646 A1* | 3/2004 | Eskridge | G08G 1/127 235/487 |
| 2006/0055561 A1* | 3/2006 | Kamali | G08G 1/017 340/936 |
| 2007/0048084 A1* | 3/2007 | Jung | H04L 67/52 404/9 |
| 2007/0082397 A1* | 4/2007 | Hasson | A61P 1/18 435/366 |
| 2007/0083297 A1 | 4/2007 | Tengler | |
| 2007/0136078 A1 | 6/2007 | Plante | |
| 2007/0156311 A1 | 7/2007 | Elcock et al. | |
| 2008/0238719 A1* | 10/2008 | Marchasin | G08G 1/017 340/901 |
| 2009/0015684 A1* | 1/2009 | Ooga | G08G 1/0175 348/222.1 |
| 2009/0234552 A1 | 9/2009 | Takeda et al. | |
| 2010/0073124 A1* | 3/2010 | Mahalingaiah | G07C 5/006 340/5.1 |
| 2010/0153207 A1* | 6/2010 | Roberts | H04W 4/024 705/14.63 |
| 2011/0202591 A1* | 8/2011 | Reis | G06Q 10/08 709/246 |
| 2012/0116825 A1* | 5/2012 | Gallais | G07C 5/008 705/5 |
| 2013/0006674 A1* | 1/2013 | Bowne | G06Q 10/0833 705/4 |
| 2013/0124064 A1* | 5/2013 | Nemoto | B60K 31/0058 701/1 |
| 2013/0212221 A1* | 8/2013 | Yamane | H04W 8/24 709/217 |
| 2014/0111647 A1* | 4/2014 | Atsmon | G08G 1/14 348/148 |
| 2014/0379384 A1* | 12/2014 | Duncan | G06Q 40/08 705/4 |
| 2015/0127191 A1* | 5/2015 | Misra | G08G 1/056 701/1 |
| 2015/0134193 A1* | 5/2015 | Krueger | G07C 5/008 701/31.5 |
| 2015/0145695 A1* | 5/2015 | Hyde | G08G 1/166 340/905 |
| 2015/0206355 A1* | 7/2015 | Hubbard | G08G 1/096775 701/1 |
| 2015/0221140 A1* | 8/2015 | Eid | G06Q 40/12 705/13 |
| 2015/0312400 A1* | 10/2015 | Hansen | G06V 20/63 455/414.1 |
| 2016/0101786 A1* | 4/2016 | Johnson | G01S 19/34 701/32.4 |
| 2016/0163011 A1* | 6/2016 | Zimmerman | G06F 16/242 705/325 |
| 2017/0015278 A1* | 1/2017 | Yap | B60R 25/102 |
| 2017/0076605 A1* | 3/2017 | Suzuki | G08G 1/133 |
| 2017/0186320 A1* | 6/2017 | Lai | H04L 67/12 |
| 2017/0210323 A1 | 7/2017 | Cordova et al. | |
| 2017/0263120 A1* | 9/2017 | Durie, Jr. | G08G 1/205 |
| 2017/0305437 A1* | 10/2017 | Onorato | G06Q 50/40 |
| 2017/0352265 A1* | 12/2017 | Kumabe | G07C 5/0808 |
| 2017/0358154 A1* | 12/2017 | Ishikawa | G07C 5/085 |
| 2018/0017408 A1* | 1/2018 | Suzuki | G01C 21/3679 |
| 2018/0018869 A1* | 1/2018 | Ahmad | G08G 1/054 |
| 2018/0079422 A1* | 3/2018 | Weinstein-Raun | G08G 1/127 |
| 2018/0079423 A1* | 3/2018 | Weinstein-Raun | B60W 30/14 |
| 2018/0121763 A1* | 5/2018 | Surnilla | G06V 10/809 |
| 2018/0201260 A1* | 7/2018 | Ichikawa | G01S 17/58 |
| 2018/0218607 A1* | 8/2018 | Baghel | G08G 1/166 |
| 2018/0225341 A1* | 8/2018 | Merg | G06F 16/285 |
| 2018/0286222 A1* | 10/2018 | Urano | G08G 1/015 |
| 2018/0308353 A1* | 10/2018 | He | A61B 5/18 |
| 2018/0341277 A1* | 11/2018 | Yang | G05D 1/0293 |
| 2019/0019356 A1* | 1/2019 | Liu | G05B 23/0283 |
| 2019/0051142 A1* | 2/2019 | Wiles | H04W 4/06 |
| 2019/0072968 A1* | 3/2019 | Will, IV | G06N 3/006 |
| 2019/0079659 A1* | 3/2019 | Adenwala | H04W 4/46 |
| 2019/0082377 A1* | 3/2019 | Silver | G08G 1/096741 |
| 2019/0138841 A1* | 5/2019 | Wang | G06F 16/51 |
| 2019/0205675 A1* | 7/2019 | McGill | B60W 30/18009 |
| 2019/0370569 A1* | 12/2019 | Gulati | G01S 13/931 |
| 2020/0019186 A1* | 1/2020 | Ichien | H04W 4/46 |
| 2020/0193549 A1* | 6/2020 | Pedersen | G06Q 50/40 |
| 2020/0211303 A1* | 7/2020 | Walsh | G06N 7/01 |
| 2020/0228946 A1* | 7/2020 | Hwang | H04W 4/40 |

OTHER PUBLICATIONS

IPCOM, Initiating Communication With An Adjacent Moving Vehicle (Year: 2010).
Ito et al., A Road Condition Sharing System Using Vehicle-to-Vehicle Communication in Various Communication Environment (Year: 2015).
Xu et al., PPLS A Privacy-Preserving Location-Sharing Scheme in Vehicular Social Networks (Year: 2018).
Sung et al., System architecture for autonomous driving with infrasturcture sensors (Year: 2012).
Zwahlen et al., SATURN (Situational awareness tool for urban responder networks) (Year: 2012).

* cited by examiner

VEHICLE TRACKING TECHNIQUES

CROSS-REFERENCE TO RELATED APPLICATION

This application is a continuation of U.S. patent application Ser. No. 16/827,435, titled "Vehicle Tracking Techniques," which was filed on Mar. 23, 2020, which is a continuation of U.S. patent application Ser. No. 16/247,224, titled "Vehicle Tracking Techniques," which was filed on Jan. 14, 2019, now U.S. Pat. No. 10,623,834, issued Apr. 14, 2020, which claims the benefit of U.S. Provisional Patent Application No. 62/617,432, titled "Vehicle Tracking Techniques," which was filed on Jan. 15, 2018, each of which is hereby incorporated by reference in its entirety for all purposes.

BACKGROUND

The present disclosure relates generally to systems and methods for monitoring and/or tracking a vehicle (e.g., an automotive vehicle). More specifically, the present disclosure relates to systems and methods to determine a behavior, location, and/or characteristic associated with the vehicle via sensors of additional vehicles near the vehicle.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Automotive vehicles, such as motorcycles, buses, autonomous cars, and/or the like may include sensors capable of providing a wide array of information related to the vehicle and its surroundings to a driver of the vehicle and/or to other recipients. For example, a vehicle may include a navigation system that may provide traffic and/or route information to a driver controlling the vehicle. The navigation system may further provide a location of the vehicle to, for example, an owner of the vehicle when the vehicle is lost and/or missing. However, some vehicles (e.g., other vehicles within a sensor detection proximity to the vehicle) lack suitable sensors to sufficiently provide information (e.g., a location) related to themselves to a driver and/or to other recipients.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a vehicle monitoring system includes a vehicle database, which includes information associated with a plurality of vehicles. Additionally, the vehicle monitoring system includes a sensor database, which may include information captured by a sensor of an observing vehicle. The vehicle monitoring system also includes one or more processors, which may be configured to generate a request to capture information associated with a target vehicle. The one or more processors are also configured to transmit the request to the sensor of the observing vehicle in response to determining that the information captured by the sensor of the observing vehicle does not comprise the information associated with the target vehicle. The sensor of the observing vehicle is configured to capture the information associated with the target vehicle based at least in part on the request. Further, the one or more processors are configured to receive the information associated with the target vehicle from the sensor of the observing vehicle and to store the information associated with the target vehicle in the vehicle database. The one or more processors are also configured to output the information associated with the target vehicle to a computing device.

In another embodiment, a method involves receiving, at one or more processors of a vehicle monitoring system, a request for information associated with a target vehicle from a first computing device. The method also involves transmitting, using the one or more processors of the vehicle monitoring system, the request to an observing vehicle. A sensor of the observing vehicle may be configured to capture the information associated with the target vehicle based at least in part on the request. Further, the method involves receiving, at the one or more processors of the vehicle monitoring system, the information associated with the target vehicle from the sensor of the observing vehicle and storing, using the one or more processors of the vehicle monitoring system, the information associated with the target vehicle in a vehicle database, which includes information associated with a plurality of vehicles. The method also involves outputting, using the one or more processors of the vehicle monitoring system, the information associated with the target vehicle to a second computing device.

In another embodiment, a vehicle monitoring system includes a vehicle database, which includes a first profile having first information associated with a first vehicle and a second profile having second information associated with a second vehicle. The vehicle monitoring system also includes one or more processors configured to generate a request to capture third information associated with the first vehicle different from the first information associated with the first vehicle. The one or more processors are also configured to transmit the request to a sensor of an observing vehicle. The sensor of the observing vehicle is configured to capture the third information associated with the first vehicle based at least in part on the request. Moreover, the one or more processors are configured to receive the third information associated with the first vehicle from the sensor of the observing vehicle. Further, the one or more processors are configured to store the third information associated with the first vehicle in the vehicle database. Storing the third information associated with the first vehicle may involve updating the first profile based at least in part on the third information associated with the first vehicle. The one or more processors are also configured to output the third information associated with the first vehicle to a computing device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
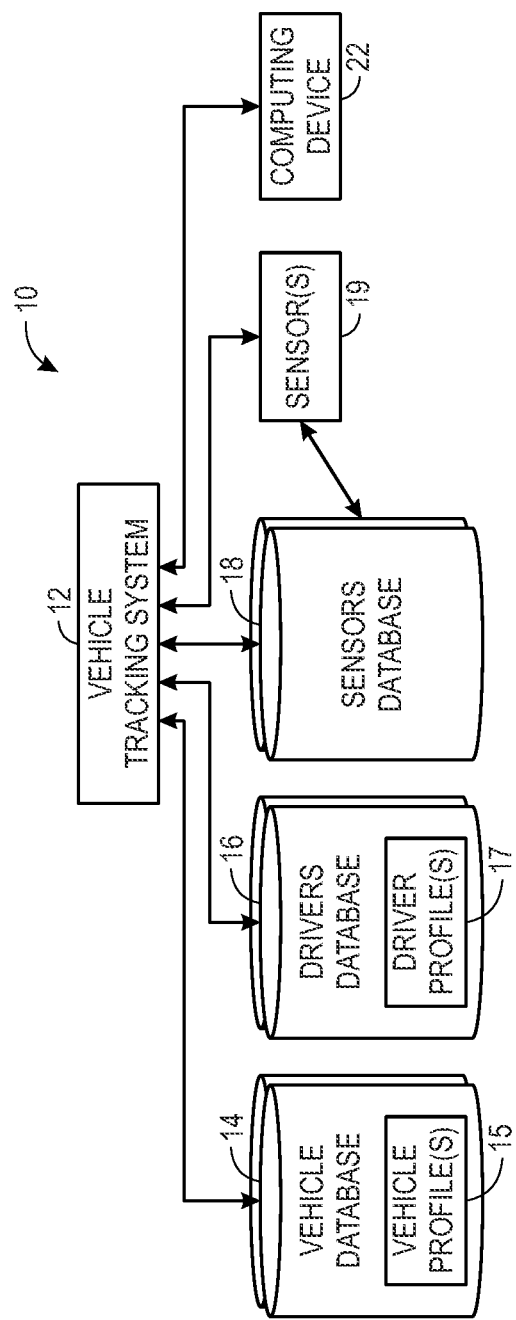
FIG. 1 illustrates a block diagram of a vehicle monitoring system, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure relates generally to improved systems and methods for obtaining information related to a vehicle (e.g., an automotive vehicle). More specifically, present embodiments are directed to logging and determining a behavior, location, description, and/or the like associated with the vehicle using sensors of additional vehicles. In some embodiments, a vehicle tracking system may interface with one or more databases that store information related to a number of vehicles. The vehicle tracking system may further interface with one or more databases that store information related to a number of drivers (e.g., vehicle operators). Further, the vehicle tracking system may interface with one or more databases that store information related to a number of sensors, such as speedometers, cameras, global positioning systems (GPSs), and/or the like, that may be configured to capture information related to a vehicle. That is, the vehicle tracking system and/or the one or more databases that store information related to the number of sensors may further interface with the number of sensors. To that end, the vehicle tracking system may populate any of its one or more databases that store information related to the number of vehicles, the number of drivers, or the number of sensors based on the information captured by the number of sensors. Accordingly, information related to a vehicle may be determined from the vehicle tracking system.

In some embodiments, the vehicle tracking system may receive a request for information related to a target vehicle, may retrieve information related to the target vehicle, and may output the retrieved information related to the target vehicle to, for example, a computing device. Further, the vehicle tracking system may retrieve and output information related to the vehicle regardless of whether the target vehicle includes suitable sensors to sufficiently provide the requested information. That is, for example, the vehicle tracking system may rely on sensors external to a target vehicle, such as sensors included in an additional vehicle (e.g., an observing vehicle), to retrieve information related to the target vehicle. For example, to determine the location of a target vehicle that lacks a GPS, the vehicle tracking system may communicate with one or more sensors, such as a camera, a GPA, and/or the like, in an observing vehicle that is proximate to the target vehicle. Additionally, the vehicle tracking system may use information captured by sensors in vehicles uninvolved in, but present at the scene of a vehicle accident (e.g., collision) involving the target vehicle to analyze and/or reconstruct the accident. Further, in some embodiments, the vehicle tracking system may identify whether the target vehicle is operating and/or is operated by a driver demonstrating risky and/or unlawful behavior (e.g., speeding) based on data captured by sensors associated with the target vehicle, an observing vehicle proximate to the target vehicle, or a combination thereof. Accordingly, the vehicle tracking system may determine information related to a target vehicle with improved range and/or efficiency. That is, by automatically detecting and determining information related to a target vehicle, even if the target vehicle lacks suitable sensors, the vehicle tracking system may improve the range and/or efficiency involved with determining the information related to the target vehicle. Additional details regarding the vehicle tracking system and various processes performed by the vehicle tracking system will be described below with reference to FIGS. 1-3.

By way of introduction, FIG. 1 is a block diagram of a vehicle monitoring system 10 that may observe and/or log information related to a vehicle, in accordance with embodiments described herein. The vehicle monitoring system 10 may, for example, monitor certain behaviors, locations, and/or characteristics (e.g., a description) associated with a vehicle. The vehicle monitoring system 10 may further track information related to a driver of one or more vehicles. As such, the vehicle monitoring system 10 may include a vehicle tracking system 12, a vehicles database 14, a drivers database 16, a sensors database 18, one or more sensors 19, and a computing device 22. The vehicle tracking system 12, in certain embodiments, may be a cloud-based computing system that includes a number of computers that may be connected through a real-time communication network, such as the Internet. In one embodiment, large-scale analysis operations may be distributed over the computers that make up the cloud-based computing system. Although the vehicle tracking system 12 is described above as a cloud-based computing system, the vehicle tracking system 12 may be any suitable computing system or device that is capable of communicating with other devices and processing data, in accordance with the techniques described herein.

In one embodiment, the vehicle tracking system 12 may communicatively couple to the vehicles database 14. The vehicles database 14 may store data (e.g., information) related to a number of different vehicles (e.g., cars, trucks, motorcycles, and/or the like). Further, the vehicles database 14 may store this data in a vehicle profile 15 for each vehicle that may include information, such as an identifier, for a respective vehicle. For example, the identifier of the vehicle may include a name and/or an identification number or code associated with the vehicle. Further, the vehicle profile 15 may include data regarding a license plate number, a license plate state, a make, a model, a year, a color, a history (e.g., accident history), and/or the like of the respective vehicle. The history of the vehicle may include a description of events and/or changes involving the vehicle, such as accidents (e.g., collisions), damage, and/or repairs involving and/or made to the vehicle. The history may further include a set of dates indicating when the events and/or changes occurred.

Further, in some embodiments, the vehicle database 14 may include incomplete vehicle profiles 15. That is, each vehicle profile 15 may include as much suitable information related to a vehicle that is available to the vehicle tracking system 12. For example, a first vehicle profile 15 may include an identifier, a make, a model, and a color and may lack additional information related to a respective vehicle, while a second vehicle profile 15 may include an identifier, a license plate number, and a history of a respective vehicle. As such, because the vehicle tracking system 12 may include and/or receive more information related to some vehicles than others, each vehicle profile 15 may contain a variable amount of information related to a respective vehicle.

The vehicle tracking system 12 may additionally or alternatively communicate with the drivers database 16. In some embodiments, the drivers database 16 may store data related to a driver (e.g., operator) of a vehicle. Accordingly, the drivers database 16 may store a driver profile 17 having information regarding the identity of the driver, such as a name and/or identification number or code, a reference to a vehicle associated with the driver, and/or a description of the driver for each driver. As a driver may operate multiple vehicles, a driver profile 17 may include references to multiple vehicles associated with the same driver. Further, as more than one driver may operate a vehicle, multiple driver profiles 17 may include a reference to the same vehicle. In some embodiments, the description of the driver may include information such as a driver's license number, a height, a hair color, an age, and/or the like associated with the driver. As the features of the driver included in the description of the driver may change (e.g., the driver may grow taller, change hair color, grow older, and/or the like), it should be understood that the description of the driver may be an approximate description of the driver. Further, as described with reference to the vehicle profiles 15, the driver profiles 17 may include variable amounts of information related to a respective driver according to the information available to the vehicle tracking system 12.

Further, the vehicle monitoring system 10 may include one or more sensors 19 that may capture information related to a vehicle and/or a driver, such as the data included in a vehicle profile 15 or a driver profile 17, respectively. A sensor 19 may include any suitable sensing device, such as a speedometer, an odometer, an infrared laser, a sonic sensor (e.g., ultrasonic sensor), a camera, a global positioning system (GPS) sensor, and/or the like. To that end, information captured by a sensor 19 may include, for example, a speed, mileage, make, model, color, proximity to an object (e.g., another vehicle), location, and/or the like associated with a vehicle, as well as a time and/or date that the information was captured. The information captured by a sensor 19 may further include, for example, an identity and/or description associated with a driver of a vehicle. Further, the one or more sensors 19 may be located within a vehicle and/or exterior to the vehicle, but within a certain vicinity (e.g., a radius in which the sensor may capture information) of the vehicle. For example, a sensor 19 that captures information related to a first vehicle may be included in a second (e.g., observing) vehicle. In any case, a sensor 19 may obtain information related to a vehicle and/or driver and may transmit the information to the vehicle tracking system 12 and/or to a database (e.g., sensor database 18).

In some embodiments, the one or more sensors 19 may capture information related to a vehicle and/or driver synchronously or with a certain periodicity (e.g., once every second, minute, or hour), while in other embodiments the one or more sensors may additionally or alternatively capture information asynchronously or in response to a request, which may be received from the vehicle tracking system 12, as described below. Further, the sensors 19 may transmit captured information to the vehicle tracking system 12 after receiving a request from the vehicle tracking system 12, with a certain periodicity, and/or when the captured data meets some criteria, such as when the sensors 19 detect a collision involving a vehicle, a vehicle braking suddenly, and/or a vehicle reaching some speed.

With this in mind, the vehicle monitoring system 10 may include the sensors database 18 that may store data associated with information obtained from the one or more sensors 19, as described herein. That is, the sensors database 18 may contain information related to a vehicle and/or driver that is captured by a sensor 19. As such, in some embodiments, the sensors database 18 may include information captured from a sensor 19 associated with a reference to one or more drivers, a reference to one or more vehicles, or a combination thereof.

While the embodiments herein describe separate databases for the vehicles database 14, the drivers database 16, and the sensors database 18, it should be understood by one skilled in the art that embodiments may include any suitable number of databases to store the relevant information related to the vehicles, the drivers, and/or the sensors. As such, fewer or additional databases may be used in the vehicle monitoring system 10.

To monitor and/or track a vehicle, the vehicle tracking system 12 may generate and/or receive suitable data regarding the vehicle, a driver of the vehicle, and/or a sensor 19. That is, the vehicle tracking system 12 may automatically populate and update the information maintained in the vehicles database 14, the drivers database 16, and/or the sensors database 18 based on the sensors 19 included in the vehicle tracking system 12. As such, the vehicle tracking system 12 may receive information from a sensor 19 and may update one or more databases (e.g., vehicles database 14, the drivers database 16, and/or the sensors database 18) accordingly. For example, the vehicle tracking system 12 may receive information from a sensor 19 related to a vehicle that is not included in the vehicles database 14 (e.g., a vehicle profile 15 is not associated with the vehicle). As such, the vehicle tracking system 12 may create a new vehicle profile 15 and may populate the vehicle profile 15 with any relevant information related to the vehicle that is included in the information from the sensor. The vehicle tracking system 12 may further update an existing vehicle profile 15, store and/or update sensor data in the sensor database, create and/or update a driver profile 17, and/or the like based on information received from a sensor 19.

Additionally or alternatively, the vehicle tracking system 12 may receive an input from the computing device 22 to update the vehicles database 14, the drivers database 16, the sensors database 18, or a combination thereof. That is, the input from the computing device 22 may provide information to supplement and/or override information in the vehicles database 14, the drivers database 16, and/or the sensors database 18 to add, update, or remove vehicle profiles 15 and/or driver profiles 17. As such, a user or administrator of the vehicle tracking system 12 may, for example, use the computing device 22 to create and send an input to update the vehicles database 14, the drivers database 16, and/or the sensors database 18. For example, the user may provide an input including information related to the new or updated vehicle profile 15. That is, in some embodiments, a computing device 22 may be used to create and/or update a vehicle profile 15 by providing an input to the vehicle tracking system 12 indicating these changes. Further, based on changes to the vehicle profile 15 in the vehicles database 14, the vehicle tracking system 12 may update and/or create a new driver profile 17 and/or update information in the sensors database 18. As such, the vehicle tracking system 12 may update and/or populate information included in any database (e.g., the vehicles database 14, the drivers database 16, or the sensors database 18) based in part on changes made to any other database.

The computing device 22 may include any suitable processor-based computing system, such as a desktop computer, a laptop computer, a mobile computing device (e.g., smart phone), a tablet computing device, and the like. In any case, the computing device 22 may transmit an input to the vehicle tracking system 12. Further, in some embodiments, the computing device 22 may receive a notification (e.g., alert) from the vehicle tracking system 12 associated with a monitored vehicle (e.g., a vehicle with a vehicle profile 15). In such embodiments, the computing device 22 may provide an indication that the notification was received. The indication may be a ring tone, a vibration pattern, a visualization, a reminder, a task, an audio message, or the like. In some embodiments, the notification may activate an application or program stored on the computing device 22, despite the computing device 22 being in a sleep or low power mode, to increase the likelihood that a user will take note of the notification.

Although the vehicle tracking system 12 is described as sending notifications to the computing device 22, in some embodiments, the vehicle tracking system 12 may be a computing device associated with a user of the vehicle tracking system 12. As such, the vehicle tracking system 12 may be accessible to the user and may generate visualizations and alerts to notify the user regarding a monitored vehicle.

Figure 2:
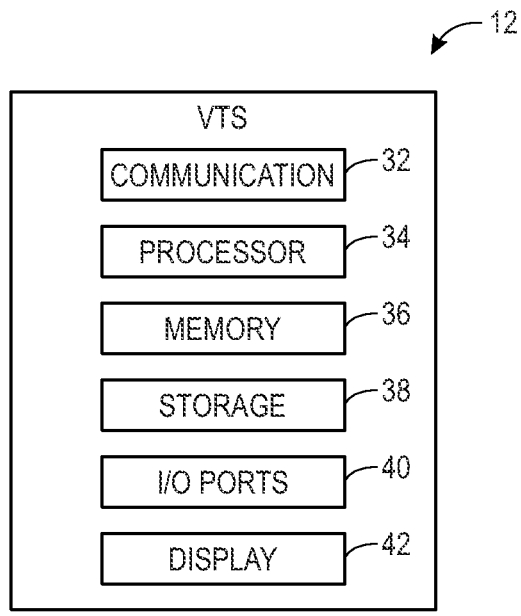
FIG. 2 illustrates a block diagram of the vehicle tracking system that may be part of the vehicle monitoring system of FIG. 1, in accordance with embodiments described herein.

To perform some of the actions set forth above, the vehicle tracking system 12 may include certain components to facilitate these actions. FIG. 2 is a block diagram of example components within the vehicle tracking system 12, in accordance with the embodiments described herein. For example, the vehicle tracking system 12 may include a communication component 32, a processor 34, a memory 36, a storage 38, input/output (I/O) ports 40, a display 42, and the like. The communication component 32 may be a wireless or wired communication component 32 that may facilitate communication between, for example, the vehicles database 14, the drivers database 16, the sensors database 18, the one or more sensors 19, the computing device 22, and the like. The processor 34 may be any type of suitable computer processor or microprocessor capable of executing computer-executable code. The processor 34 may also include multiple processors that may perform the operations described below.

The memory 36 and the storage 38 may be any suitable articles of manufacture that may serve as media to store processor-executable code, data, or the like. These articles of manufacture may represent non-transitory, computer-readable media (e.g., any suitable form of memory or storage) that may store the processor-executable code used by the processor 34 to perform the presently disclosed techniques. The memory 36 and the storage 38 may also be used to store data, various other software applications, and the like. For example, the memory 36 and the storage 38 may not only store the processor-executable code used by the processor 34 to perform various techniques described herein but code for other techniques as well. It should be noted that the term "non-transitory" merely indicates that the media is tangible and not a signal.

The input/output (I/O) ports 40 may be interfaces that may couple to other peripheral components such as input devices (e.g., keyboard, mouse), sensors, input/output (I/O) modules, and the like. The display 42 may operate to depict visualizations associated with software or executable code being processed by the processor 34. In one embodiment, the display 42 may be a touch display capable of receiving inputs from a user of the vehicle tracking system 12. The display 42 may be any suitable type of display 42, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the vehicle tracking system 12.

It should be noted that the components described above with regard to the vehicle tracking system 12 are exemplary components and the vehicle tracking system 12 may include additional or fewer components compared to those shown. Additionally, it should be noted that the computing device 22 may also include similar components as described as part of the vehicle tracking system 12.

Figure 3:
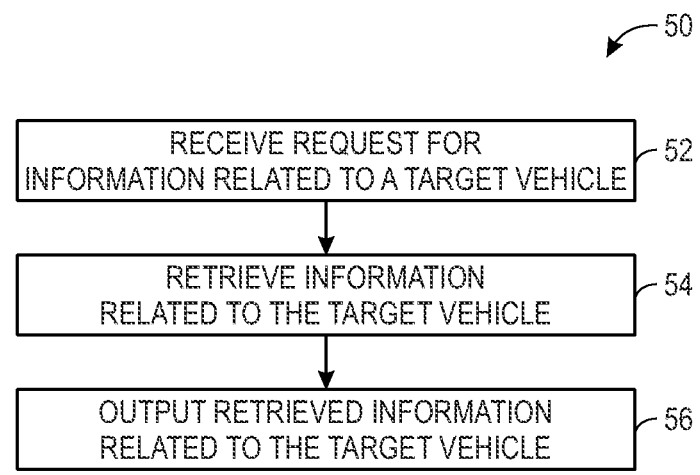
FIG. 3 illustrates a flow chart of a method for determining a behavior, location, and/or characteristic associated with a target vehicle via the vehicle monitoring system of FIG. 1, in accordance with embodiments described herein.

With the foregoing in mind, FIG. 3 illustrates a flow chart of a method 50 for monitoring and/or tracking a vehicle (e.g., a target vehicle), in accordance with embodiments described herein. More specifically, the method 50 may be used, for example, to determine a behavior, location, and/or characteristic associated with the vehicle. Although the following description of the method 50 is described in a particular order, which represents a particular embodiment, it should be noted that the method 50 may be performed in any suitable order. Further, certain steps may be skipped altogether, and additional steps may be included in the method 50. Moreover, although the following description of the method 50 is described as being performed by the vehicle tracking system 12, it should be noted that the method 50 may be performed by any suitable computing device. More specifically, in some embodiments, the method 50 may be implemented by a processor (e.g., processor 34), which is understood to include one or more processors.

The method 50 may be triggered (e.g., initiated) at block 52 when the vehicle tracking system 12 receives a request for information (e.g., a behavior, location, and/or characteristic) related to a target vehicle. In some embodiments, the vehicle tracking system 12 may automatically generate the request. For example, the vehicle tracking system 12 may generate the request in response to an update to any one of the databases (e.g., the vehicles database 14, the drivers database 16, and/or the sensors database 18). That is, the vehicle tracking system 12 may generate the request in response to receiving information from a sensor 19 and/or an input from the computing device 22. In another embodiment, the vehicle tracking system 12 may automatically generate the request with a certain periodicity (e.g., every 1, 8, 12, 24, 48 hours, every week, every two weeks, or the like). Further, in some embodiments, the vehicle tracking system 12 may receive the request from the computing device 22. That is, a user may request information related to a target vehicle via the computing device 22, regardless of any changes to any of the databases.

Further, to identify the target vehicle, the request may include details related to a specific vehicle or group of vehicles, such as those that a vehicle profile 15 may include. That is, for example, the request may include information such as the make, model, year, identifier, and/or the like to specify a target vehicle. In some embodiments, the vehicles database 14 may include information (e.g., a vehicle profile 15) related to the target vehicle. In such embodiments, the request may include information (e.g., location information associated with the target vehicle) mapping directly to the target vehicle. Additionally or alternatively, the request may include information to narrow the target vehicle to a group of vehicles whose vehicle profiles 15 match some or all of the information related to the target vehicle included in the request. Further, in some embodiments, the vehicles database 14 may not include a vehicle profile 15 associated with the target vehicle. That is, the request may include information identifying a target vehicle that is new to the vehicle tracking system 12.

As a first illustrative example, at block 52, the vehicle tracking system 12 may receive a request via the processor 34 or from a user for the location of a target vehicle that may lack sensors 19 configured to communicate with the vehicle tracking system 12 or may lack sensors 19 capable of communicating the target vehicle's location to the vehicle tracking system. As such, to identify the target vehicle, the user may provide, for example, a make, model, color, license plate, and/or an estimate location (e.g., the last known location) of the vehicle. As a second illustrative example, at block 52, the vehicle tracking system 12 may receive a request via the processor 34 or from a user to determine the involvement (e.g., behavior) of a target vehicle in an accident. That is, the processor 34 or the user may initiate method 50 to reconstruct an accident involving the target vehicle. The vehicle tracking system 12 may further receive and/or determine an identifier of the target vehicle based on the request. Further, as a third illustrative example, at block 52, the vehicle tracking system 12 may receive a request via the processor 34 to determine whether a target vehicle is operating and/or is operated by a driver demonstrating risky and/or unlawful behavior (e.g., speeding). In the third illustrative example, the vehicle tracking system 12 may automatically generate the request to, for example, monitor the behavior of the target vehicle in a certain proximity of an additional vehicle so that the additional vehicle may be made aware of the current driving behavior of the target vehicle. Additionally or alternatively, the processor 34 or a user may request information determining whether the target vehicle habitually demonstrates unlawful behavior from the vehicle tracking system 12.

Once the method 50 is initiated by a suitable event (e.g., a request for information related to a target vehicle), at block 54, the vehicle tracking system 12 may retrieve information via the processor 34 related to the target vehicle. The process to retrieve the information related to the target vehicle may depend in part on the target vehicle itself. That is, for example, if the vehicles database 14 includes a vehicle profile 15 associated with the target vehicle, the vehicle tracking system 12 may retrieve the information related to the target vehicle by retrieving the vehicle profile 15 associated with the target vehicle from the vehicles database 14. If the retrieved information is insufficient to determine a specified characteristic of the vehicle (e.g., the location of the vehicle) or if the vehicle tracking system 12 lacks information related to the target vehicle, the vehicle tracking system 12 may send a request to one or more sensors 19 to determine the information related to the target vehicle. Further, if the target vehicle is new to the vehicle tracking system 12, the vehicle tracking system 12 may retrieve information related to the target vehicle via one or more sensors 19. Accordingly, the vehicle tracking system 12 may, for example, send a request to one or more sensors 19 to capture information related to the target vehicle. In such embodiments, the vehicle tracking system 12 may create a new vehicle profile 15 associated with the target vehicle and/or add information related to the target vehicle to the databases (e.g., the vehicles database 14, the drivers database 16, the sensors database 18, or a combination thereof). Further, in some embodiments, the target vehicle tracking system 12 may retrieve the information related to the target vehicle through a suitable combination of the techniques described above.

Continuing with the first illustrative example, at block 54, after receiving the request from the user to determine the location of the target vehicle, the vehicle tracking system 12 may determine whether information related to the target vehicle is included in the vehicle tracking system 12 (e.g., whether any information related to the target vehicle is included in any of the vehicles database 14, the drivers database 16, or the sensors database 18). If information related to the target vehicle is included, the vehicle tracking system 12 may then determine whether the included information is sufficient to determine the location of the target vehicle. If the included information is insufficient to determine the location of the vehicle or if the vehicle tracking system 12 lacks information related to the target vehicle, the vehicle tracking system 12 may send a request to one or more sensors 19 to determine the location of the target vehicle. As such, the request to the one or more sensors 19 may activate the one or more sensors 19 and may provide parameters (e.g., the make, model, year, license plate, and/or information provided by the user) to identify the target vehicle so that when a sensor 19 detects the target vehicle, it may communicate information, such as the location of the target vehicle to the vehicle tracking system 12. In some embodiments, for example, if the target vehicle lacks suitable sensors 19 to determine its location, the tracking system 12 may utilize an additional vehicle, which may or may not be proximate to the estimated location of the target vehicle, with a sensor 19 that is configured to communicate with the vehicle tracking system 12 to locate the target vehicle when the target vehicle is within a proximity of the sensor 19. For example, as the target vehicle drives near an additional vehicle with a camera that identifies the target vehicle, a GPS in the additional vehicle and/or a computing device 22 associated with the GPS may communicate the location of the target vehicle to the vehicle tracking system 12.

Continuing with the second illustrative example, at block 54, the vehicle tracking system 12 may retrieve the vehicle profile 15 associated with the target vehicle. The vehicle tracking system 12 may then retrieve a driver profile 17 containing a reference to the vehicle profile (e.g., mapping the driver profile 17 to the vehicle profile 15) if the vehicle tracking system 12 includes the driver profile 17. Further, the vehicle tracking system 12 may retrieve sensor data from the sensors database 18 containing a reference to the target vehicle. The vehicle tracking system 12 may limit the sensor data retrieved to sensor data collected at a certain time and/or location that the accident occurred. The sensor data may include information, such as pictures, video captures, vehicle speeds, road conditions, weather conditions, construction indications, and the like, that one or more sensors 19 near the accident may have captured. In some embodiments, vehicles uninvolved, but present at the scene of the accident may act as witnesses to the incident via their respective sensors 19. That is, the vehicle tracking system 12 may associate sensor data collected from sensors 19 included in the uninvolved vehicles to the target vehicle and may use the sensor data to reconstruct and/or analyze the accident.

Continuing with the third illustrative example, at block 54, to monitor the current behavior of the target vehicle within a certain proximity of the additional vehicle, the vehicle tracking system 12 may send a request to one or more sensors 19. As such, as described in the first illustrative example, sensors 19 activated by the request may determine and communicate the behavior of the target vehicle to the vehicle tracking system 12. Further, to determine whether the target vehicle repeatedly demonstrates unlawful, erratic, reckless, or dangerous behavior, the vehicle tracking system 12 may retrieve a vehicle profile 15 associated with the target vehicle and/or information related to the target vehicle in any of the databases (e.g., 14, 16, and/or 18) and may determine the behavior demonstrated by the target vehicle.

At block 56, the vehicle tracking system 12 may output the retrieved information related to the target vehicle. To do so, the vehicle tracking system 12 may create notifications (e.g., alerts and/or messages) based on the retrieved information. In such embodiments, the vehicle tracking system 12 may generate a notification that identifies the target vehicle, provides the retrieved information related to the target vehicle, provides inferences based on the information related to the target vehicle, or a combination thereof. The vehicle tracking system 12 may then output the notification to the computing device 22. After sending the notification, the vehicle tracking system 12 may provide an indication to a user of the computing device 22 that the notification was received at the computing device 22. The indication may be a ring tone, a vibration pattern, a visualization, audio message, or the like.

In an embodiment, a notification may cause the computing device 22 to open, run, or execute an application. For example, the notification may cause the computing device 22 to display a visualization of the notification in the form of a text-based window or application that may display content included in the notification to the user. In an embodiment, the user may already have an application related to the notification open on the computing device 22. In such cases, the notification may appear within the application (e.g., as a pop-up display, as a header, or the like) to display a visualization of the notification to the user. Additionally or alternatively, the notification may cause the computing device 22 and/or a playback device (e.g., speakers or headphones) associated with the computing device 22 to play an audio message (e.g., an audio file) communicating the retrieved information to the user. As such, the computing device 22 may provide a hands-free method (e.g., a method that does not utilize user interaction) of providing the notification to the user. Further, the vehicle tracking system 12 may send the notification via e-mail, text message, application notifications, and/or any other suitable messaging services platform.

In certain embodiments, the computing device 22 may send a user's response to the notification. That is, the computing device 22 may monitor and communicate the user's interaction with the notification. As such, the computing device 22 may instruct the vehicle tracking system 12 to update the requested information related to the target vehicle and/or to request additional information related to the target vehicle and/or an additional vehicle based on an input from the user. That is, the notification may provide input fields that, for example, the user may use to request additional information related to any number of vehicles.

Returning to the first illustrative example, at block 56, the vehicle tracking system 12 may send a notification to a computing device 22 of the user. The notification may include information confirming the identity of the target vehicle with, for example, a picture and/or description and may include the location of the target vehicle in the form of an address, coordinates, and/or a map marking the location of the target vehicle. Further, the vehicle tracking system 12 may use the retrieved information from a sensor 19 that received a request from the vehicle tracking system 12, for example, to update and/or add information related to the targeted vehicle in the vehicles database 14, the drivers database, the sensors database 18, or a combination thereof.

Returning to the second illustrative example, at block 56, the vehicle tracking system 12 may return data related to the target vehicle and the accident involving the target vehicle to the user via a notification. The notification may aggregate information retrieved from any suitable number of sensors 19 and/or databases (e.g., 14, 16, and/or 18) and may present the information in a suitable format so that, for example, a cause of the accident is clear to the user.

Finally, returning to the third illustrative example, at block 56, the vehicle tracking system 12 may send a notification to a driver of a target vehicle (e.g., via a computing device 22 associated with the driver) and/or to the target vehicle (e.g., a computing device 22 associated with the target vehicle) to notify them of their unlawful behavior. Further, in some embodiments, the vehicle tracking system 12 may notify a driver of an additional vehicle and/or the additional vehicle. For example, the vehicle tracking system 12 may notify the additional driver and/or vehicle if the additional vehicle is within a certain proximity of the target vehicle in order to make the additional driver and/or vehicle aware of the behavior of the target vehicle. As such, the additional vehicle may, for example, avoid the target vehicle if the target vehicle is swerving unexpectedly. Further, the vehicle tracking system 12 may send a notification to a law enforcement agency (e.g., police station), for example, to alert it of the target vehicle's behavior. To that end, the vehicle tracking system 12 may output the information related to the target vehicle to any suitable number of computing devices 22 and/or other suitable outputs and may output the information to any suitable recipient (e.g., a user of the vehicle tracking system 12, a driver of the target vehicle and/or of an additional vehicle, police, and/or the like) regardless of whether the recipient requested the information.

Although the foregoing description and illustrative examples of the method 50 are described with relation to determining a location, involvement in an accident, and a behavior of a target vehicle, it should be understood that the vehicle tracking system 12 may determine any suitable information related to a target vehicle and/or a driver according to the method 50. That is, the embodiments described herein should not be limited to the examples expressly recited.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

What is claimed is:

1. One or more tangible, non-transitory, machine-readable media, comprising instructions that, when executed by processing circuitry, cause the processing circuitry to:
receive, a request for information related to a target vehicle from a computing device, wherein the request comprises an identifier associated with the target vehicle;
determine a vehicle profile associated with the target vehicle based on the identifier, wherein the vehicle profile is stored in a database;
cause a sensor of an observing vehicle to identify the target vehicle based on the request and the vehicle profile;
cause the sensor of the observing vehicle to determine the information related to the target vehicle in response to determining that the vehicle profile does not comprise the information;
update the vehicle profile to comprise the information from the sensor of the observing vehicle and store as an updated vehicle profile in the database; and
output the updated vehicle profile to the computing device.

2. The one or more tangible, non-transitory, machine-readable media of claim 1, wherein the processing circuitry is associated with a user vehicle.

3. The one or more tangible, non-transitory, machine-readable media of claim 1, wherein the information comprises a make, model, year, identifier, or any combination thereof of the target vehicle.

4. A system comprising:
one or more processors; a memory configured to store instructions, wherein the instructions are configured to cause the one or more processors to:
receive, a request for information related to a target vehicle from a computing device, wherein the request comprises an identifier associated with the target vehicle, and wherein the information comprises a location, a behavior of a driver of the target vehicle, or any combination thereof;
determine a vehicle profile associated with the target vehicle based on the identifier, wherein the vehicle profile is stored in a database;
cause a sensor of an observing vehicle to identify the target vehicle based on the request and the vehicle profile;
cause the sensor of the observing vehicle to determine the information related to the target vehicle in response to determining that the vehicle profile does not comprise the information;
update the vehicle profile to comprise the information from the sensor of the observing vehicle and store as an updated vehicle profile in the database; and
output the updated vehicle profile to the computing device.

5. The system of claim 4, wherein the information comprises an association with a traffic event involving the target vehicle and an object.

6. The system of claim 5, wherein the information comprises a picture, video, speed of the target vehicle, road condition, weather condition, construction indication, or any combination thereof, captured by the sensor of the observing vehicle at or near the traffic event.

7. The system of claim 4, wherein the information is associated with a behavior of the target vehicle, wherein the observing vehicle comprises the computing device.

8. The system of claim 7, wherein the instructions are configured to cause the one or more processors to send a notification to an additional driver of an additional vehicle, wherein the notification comprises the information associated with the behavior of the target vehicle.

9. The system of claim 8, wherein the notification is sent based on a proximity of the additional vehicle to the target vehicle.

10. The system of claim 4, wherein the computing device is configured to display a visualization associated with the information, play an audio message associated with the information, or both.

11. The system of claim 4, wherein the one or more processors are associated with a user vehicle.

12. A method, comprising:
sending, via one or more processors, a request from a computing device of a first vehicle to a second vehicle for information associated with a third vehicle,
wherein the request comprises an identifier associated with the third vehicle;
determining, via the one or more processors, a vehicle profile associated with the third vehicle based on the identifier, wherein the vehicle profile is stored in a database;
causing, via the one or more processors, a sensor of the second vehicle to identify the third vehicle based on the request and the vehicle profile;
causing, via the one or more processors, the sensor of the second vehicle to determine the information related to the third vehicle in response to determining that the vehicle profile does not comprise the information;
updating, via the one or more processors, the vehicle profile to comprise the information from the sensor of the second vehicle and storing as an updated vehicle profile in the database; and
outputting, via the one or more processors, the updated vehicle profile to the computing device associated with the first vehicle.

13. The method of claim 12, wherein the vehicle profile comprises information identifying the third vehicle related to a make, model, year, license plate number, or any combination thereof, of the third vehicle.

14. The method of claim 12, comprising wherein periodically generating, via the one or more processors, the request for information associated with the third vehicle is based on the updated vehicle profile.

15. The method of claim 12, wherein the vehicle profile associated with the third vehicle is determined based on, at least in part, on the identifier associated with the third vehicle.

16. The method of claim 12, comprising: determining, via the one or more processors, that there is no vehicle profile associated with the third vehicle; and generating, via the one or more processors, a new vehicle profile in response to determining there is no vehicle profile associated with the third vehicle.

17. The method of claim 16, comprising: causing, via the one or more processors, the sensor of the second vehicle to determine the information related to the third vehicle in response to generating the new vehicle profile.

18. The method of claim 17, wherein generating, via the one or more processors, the new vehicle profile comprises including the information associated with the third vehicle.

* * * * *